United States Patent
Lin et al.

(10) Patent No.: US 9,342,276 B1
(45) Date of Patent: May 17, 2016

(54) OPTIMIZATION TRACING

(75) Inventors: Xiaocang Lin, Wayland, MA (US);
Robert O. Aberg, South Grafton, MA (US)

(73) Assignee: The MathWorks, Inc., Natick, MA (US)

( * ) Notice: Subject to any disclaimer, the term of this patent is extended or adjusted under 35 U.S.C. 154(b) by 1157 days.

(21) Appl. No.: 11/999,317

(22) Filed: Dec. 4, 2007

(51) Int. Cl.
*G06F 9/45* (2006.01)
*G06F 9/44* (2006.01)

(52) U.S. Cl.
CPC ... *G06F 8/34* (2013.01); *G06F 8/35* (2013.01)

(58) Field of Classification Search
USPC .......................................... 717/151, 104, 131
See application file for complete search history.

(56) References Cited

U.S. PATENT DOCUMENTS

| | | | | |
|---|---|---|---|---|
| 5,187,789 A | * | 2/1993 | O'Hair ................................. | 1/1 |
| 5,946,493 A | * | 8/1999 | Hanson ........................ | 717/124 |
| 5,974,508 A | * | 10/1999 | Maheshwari ................. | 711/133 |
| 6,091,896 A | * | 7/2000 | Curreri et al. .................. | 717/125 |
| 2004/0054991 A1 | * | 3/2004 | Harres .......................... | 717/131 |
| 2004/0128661 A1 | * | 7/2004 | Ghosh et al. ................... | 717/159 |
| 2004/0210592 A1 | * | 10/2004 | Ciolfi et al. .................... | 707/101 |
| 2006/0015863 A1 | * | 1/2006 | Vaidyanathan et al. ...... | 717/170 |
| 2008/0098349 A1 | * | 4/2008 | Lin et al. ....................... | 717/106 |
| 2009/0064117 A1 | * | 3/2009 | Bashkansky et al. ......... | 717/154 |

OTHER PUBLICATIONS

Harvey, Brian Keith; Graphical User Interface for Compiler Optimizations with Simple-SUIF, Dec. 1996, UC Riverside (Thesis).*

* cited by examiner

*Primary Examiner* — Li B Zhen
*Assistant Examiner* — Joanne Macasiano
(74) *Attorney, Agent, or Firm* — Venable LLP; Michael A. Sartori; Todd R. Farnsworth

(57) ABSTRACT

A modeling environment is provided allowing a user to generate, from a source representation of a model, a target representation of a model and a listing of the optimization performed during generation of the target representation which is associated with the target representation or the source representation. The model may represent a system, such as a dynamic system. The source representation of the model may be a graphical or textual representation. In some embodiments a user may specify whether to implement the optimization.

40 Claims, 17 Drawing Sheets

Fig. 5

Window 500 — ecdemo (505):

```
1.   % Embedded MATLAB function in Simulink.
2.   function output = fcn(input1, input2)
3.
4.   if input1 == input2
5.      output = input1;
6.   else
7.      output = input1;
8.   End
9.
10.  Sum output = sum(input1, input 2)
11.  Output = input1 + input2
12.  End
13.
14.  Divider output =divide(z)
15.  Output = 1/z
16.  End
17.
18.  function2 output = fcn2(input1, input2)
19.  % Embedded MATLAB function in Simulink.
20.
21.  if input1 <= input2
22.     output = input1;
23.  else
24.     output = input1;
25.  End
26.
27.  function output = fcn3(input1, input2)
28.  % Embedded MATLAB function in Simulink.
29.
```

Second window (510, 520, 530, 540):

```
37     /* Previous zero-crossings (trigger) states */
38     PrevZCSigStates_ecdemo ecdemo_PrevZCSigState;
39
40     /* Model step function */
41     void ecdemo_step(void)
42     {
43
44       /* local block i/o variables */
45       uint8_T rtb_sum_out;
46       uint8_T rtb_switch_out;
47       boolean_T rtb_equal_to_count;
48
49       /* Sum: '<Root>/Sum' incorporates:
50        *   Constant: '<Root>/INC'
51        *   UnitDelay: '<Root>/X'
52        */
```

Expression folding: (530)
Expression folding combines multiple expressions into one expression to reduce code size and remove intermediate variables.

[Disable this optimization] (540)

```
60       /* Outputs for trigger SubSystem: '<Root>/Amplifie
61        *   Inport: '<Root>/In'
62        */
63       if(rtb_equal_to_count && (!ecdemo_PrevZCSigState.A
64
65         /* Gain: '<S1>/Gain' */
66         OUTPUT = INPUT * K;
67       }
68       ecdemo_PrevZCSigState.Amplifier_ZCE = (int32_T)rtb
69         : ZERO_ZCSIG;
```

```
37   /* Previous zero-crossings (trigger) states */
38   PrevZCSigStates_ecdemo ecdemo_PrevZCSigState;
39
40   /* Model step function */
41   void ecdemo_step(void)                                    700
42   {
43
44     /* local block i/o variables */
45     uint8_T rtb_sum_out;
46     uint8_T rtb_switch_out;
47     boolean_T rtb_equal_to_count;
48                                                             710
49     /* Sum: '<Root>/Sum' incorporates:
50      *  Constant: '<Root>/INC'
51      *  UnitDelay: '<Root>/X'
52      */
53     rtb_sum_out = (uint8_T)((uint32_T)INC + (uint32_T)
```

Expression folding:     720
Expression folding combines multiple expressions into one expression to reduce code size and remove intermediate variables.

Disable this optimization    730

```
61      *  Inport: '<Root>/In'
62      */
63     if(rtb_equal_to_count && (!ecdemo_PrevZCSigState.A
64
65       /* Gain: '<S1>/Gain' */
66       OUTPUT = INPUT * K;
67     }
68     ecdemo_PrevZCSigState.Amplifier_ZCE = (int32_T)rtb
69       : ZERO_ZCSIG;
```

*Fig. 7*

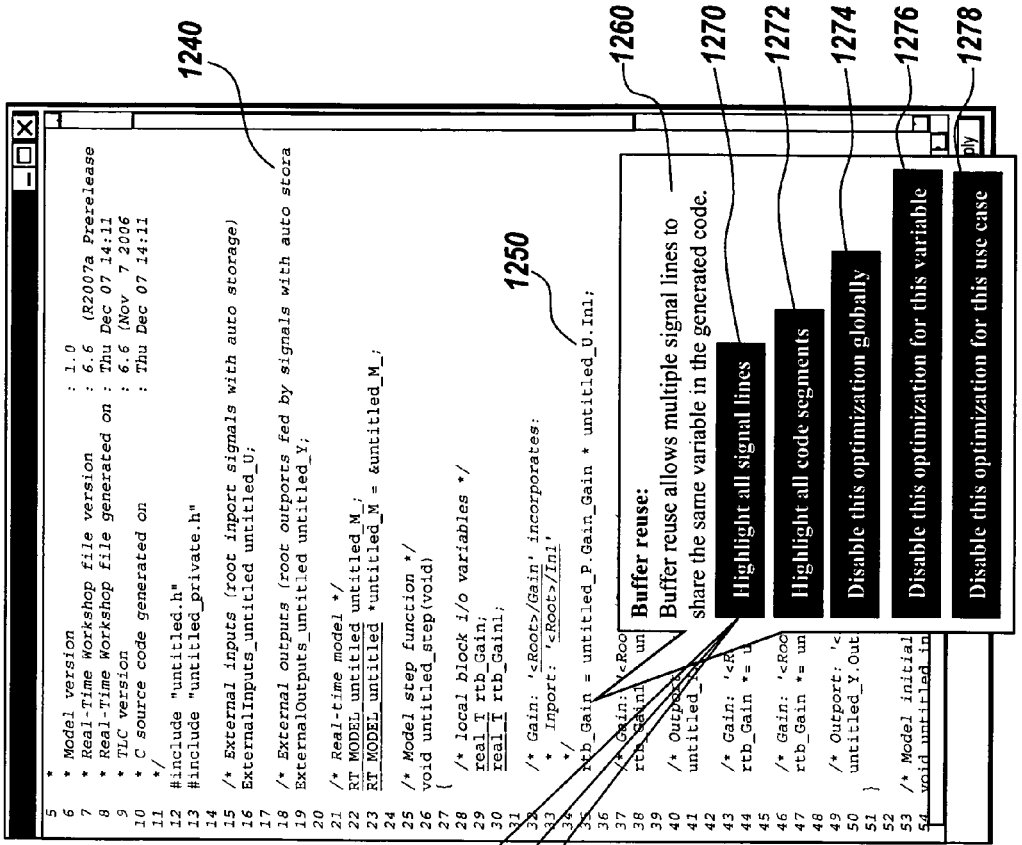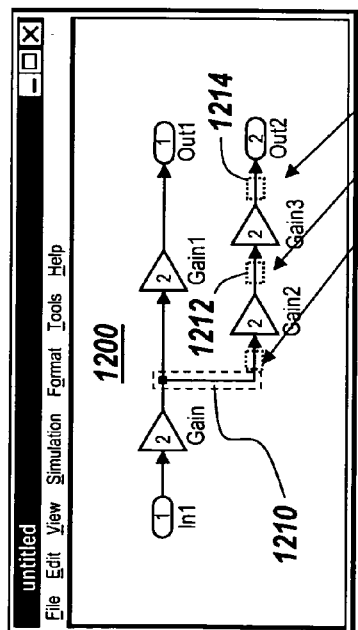
Fig. 12A ns also include instructions for compiling the source representation of the model to generate the target representation of the model. The compiling performs an optimization. The instructions then provide for saving a listing of the optimization on a storage device. Finally, there are instructions for dynamically displaying the listing, along with a display of at least one of the target representation and source representation, upon activation of a dynamic indicator associated with the listing.

OPTIMIZATION TRACING

BACKGROUND

Modeling environments may be graphical or textual. Graphical modeling environments enable users to develop graphical models of systems, whereas textual modeling environments enable users to develop textual models of systems. Modeling environments may also use a combination of graphical and textual models. Modeling environments provide users with a variety of different types of modeling functionality, such as model development, analysis, simulation, and code generation. Model development allows a user to design a model of a system. A model may be made up of several smaller models. For example, models of individual components may be grouped to create a larger model.

Simulation enables a user to simulate or execute a model to see how the model behaves. For example, a simulation may generate results that can be interpreted by a user. These simulation results can be useful in one or more ways. For example, the results may indicate how the underlying system will behave under a particular set of circumstances, results may indicate how well the model captures the behavior of the underlying system, or the results may identify flaws in the underlying system.

Code generation generates instructions for executing a model, these instructions may be in a programming language such as C or in a hardware description language. For example, code generation enables a user to develop a model of a system and then implement the model on a target device. By way of example, a model of a control system or signal processing system may be developed by a user and the user may generate code from the model. The user may then execute the generated code on a controller to implement the control system.

SUMMARY

In accordance with one embodiment, a computer readable medium is provided. The medium holds instructions computer-executable. The instructions include instructions for obtaining a source representation of a model. Instructions are also provided for compiling the source representation of the model. The instructions for compiling may include instructions for generating a target representation of the model and instructions for performing an optimization with respect to the source representation or the target representation. The medium may also hold instructions for providing an indicator associated with a listing of the optimization in the source representation of the model and the target representation of the model. The medium additionally may hold instructions for displaying the listing of the optimization on a display device when the indicator associated with the listing is activated.

In accordance with another embodiment, a method is provided for providing traceability of optimization performed during compilation in a modeling environment. First, a source representation of a model is obtained. The source representation is then compiled to generate the target representation of the model. The compiling involves an optimization. The listing of the optimization may then be saved on a storage device. The listing may then be displayed when an indicator associated with the listing in either the target representation or source representation is activated.

In accordance with another embodiment, a computer readable medium is provided. The medium holds computer-executable instructions. The instructions include instructions for obtaining a source representation of a model. The instructions also include instructions for compiling the source representation of the model to generate the target representation of the model. The compiling performs an optimization. The instructions then provide for saving a listing of the optimization on a storage device. Finally, there are instructions for dynamically displaying the listing, along with a display of at least one of the target representation and source representation, upon activation of a dynamic indicator associated with the listing.

In accordance with another embodiment, a method is provided for tracing of an optimization performed during compilation in a modeling environment. The method includes obtaining a source representation of a model. The source representation of the model may then be compiled to generate a target representation of the model. The compiling performs an optimization. A listing of the optimization may then be saved on a storage device. The listing of the optimization may then be displayed, along with at least one of the target representation and source representation, upon activation of a dynamic indicator associated with the listing.

In accordance with another embodiment, a computing system with a modeling environment is provided. The system includes a compiler and an interface. The compiler is configured to generate a target representation of a model that corresponds to a source representation of a model. The process of generating the target representation involves an optimization. The compiler is further configured to generate a listing of the optimization performed. The interface is configured to display at least one of the target representation and source representation and the listing of the optimization upon activation of an indicator associated with the listing of the optimization. The link may be provided in the target representation or source representation.

BRIEF DESCRIPTION OF THE DRAWINGS

FIG. 5 depicts an exemplary embodiment of a source representation of a model, a target representation of a model, and a listing of the optimization displayed in an exemplary integrated environment;

FIG. 7 depicts an example of a target representation of a model incorporating an indicator associated with a listing of the optimization;

FIGS. 12A and 12B depict an exemplary integrated environment wherein listing of the optimization may be accessed from a source representation of a model or a target representation of a model;

DETAILED DESCRIPTION

Exemplary embodiments provide a listing of an optimization. The listing of the optimization notifies a developer that at least one optimization was performed when a source representation of a model was compiled to produce a target representation of the model.

Listing of the optimization alleviates one potential problem that can be encountered during compiling a source representation of a model to generate a target representation of a model. The potential problem is that elements of the source representation may not have corresponding elements in the target representation. In addition, there may also be elements of the target representation of the model without corresponding elements in the source representation of the model. Optimizations often occur automatically during compilation so a user is not aware of what optimizations take place. This can make it difficult for the user to establish traceability between a source representation of a model (such as a graphical representation of a model component, a subsystem, etc) and the target representation of the model (such as code) generated from the source representation of the model.

A user may wish to maintain traceability between a source representation of a model and a target representation of the model. To that end, exemplary embodiments provide a listing of the optimization that identifies the optimization performed when a target representation of the system is compiled from a source representation of the system. Exemplary embodiments further allow the user to trace optimizations from generated code (e.g., a target representation) to a block diagram model, a text based model (e.g., a source representation), an entity/relationship diagram, etc.

Figure 1:
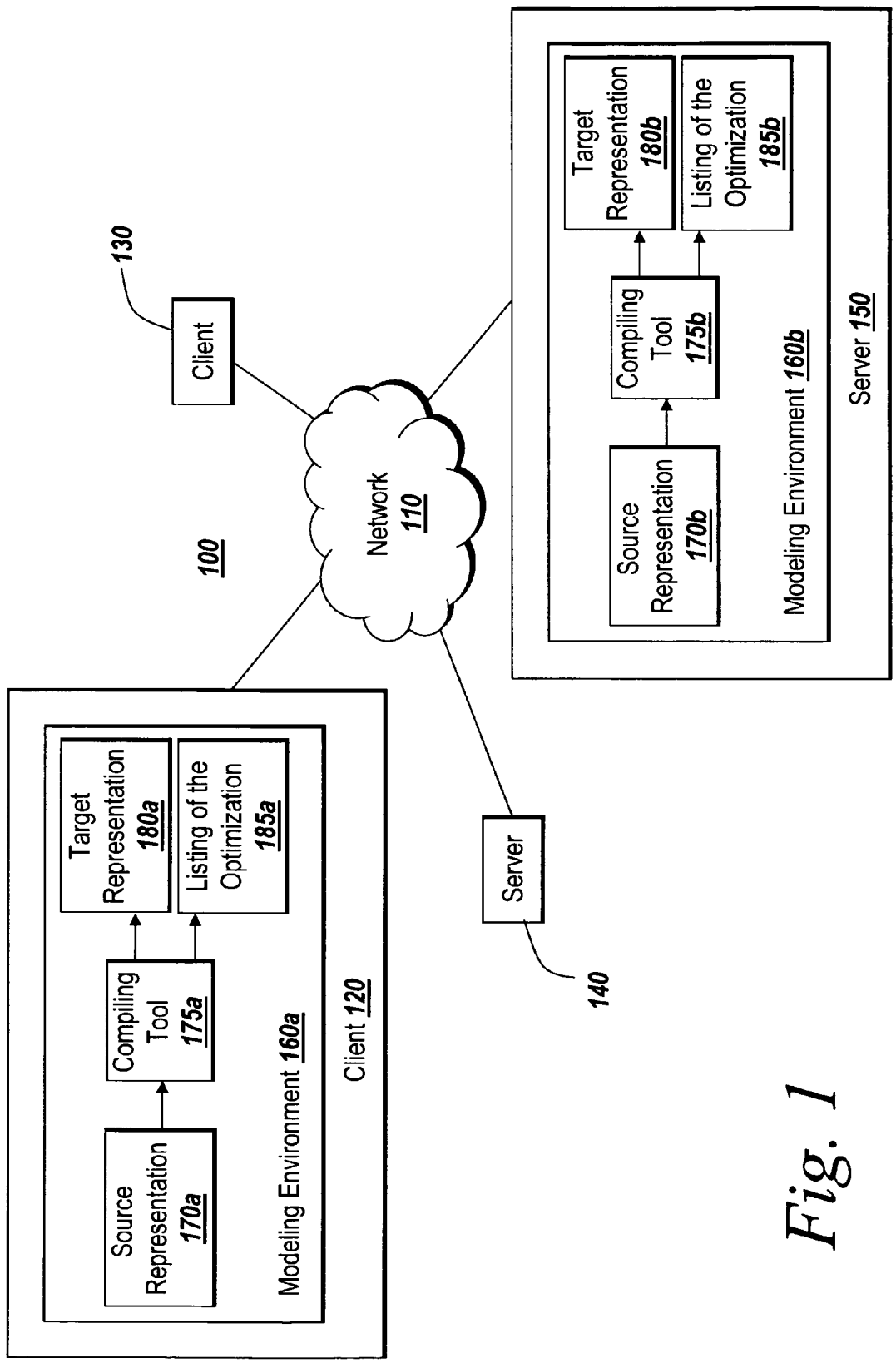
FIG. 1 depicts an exemplary distributed system suitable for distributed implementations of exemplary embodiments.

FIG. 1 is an exemplary environment suitable for implementation of exemplary embodiments. In FIG. 1, network environment 100 is suitable for a distributed implementation of the exemplary embodiments. The network environment 100 may include one or more clients 120 and 130 coupled to servers 140 and 150 via a communication network 110. In one implementation, clients 120/130 and/or servers 140/150 can be implemented as a computing device. The communication network 110 may include Internet, intranet, LAN (Local Area Network), WAN (Wide Area Network), MAN (Metropolitan Area Network), wireless network (e.g., using IEEE 802.11 and Bluetooth), etc. In addition the network may use middleware, such as CORBA (Common Object Request Broker Architecture) or DCOM (Distributed Component Object Model) to allow a computer on the network to communicate directly with another computer or device that is connected to the network.

In the network environment 100, the servers 140 and 150 may provide the clients 120 and 130 with software components or products under a particular condition, such as a license agreement. The software components or products may include a modeling environment 160a as shown on client 120. In other embodiments, a modeling environment 160b may be provided on a server, such as server 150, which may be interacted with remotely from a client, such as client 130. Each client 120, 130 and server 140, 150 may also include multiple instances of a modeling environment. For example, a server may run multiple instances of a modeling environment that may serve a number of clients, where each client may operate one or more of the instances of the modeling environment.

In exemplary embodiments, the modeling environment is used to perform a compilation process as seen in the exemplary modeling environments 160a, 160b. The compilation process involves providing a source representation of a model 170a, 170b to a compiling tool 175a, 175b. Compiling tool 175a, 175b may generate a target representation of the model 180a, 180b. Because of optimizations performed by the compiling tool 175a, 175b, there may not be a one-to-one correlation between information in the source representation of the model 170a, 170b and information in the target representation of the model 180a, 180b. Therefore, traceability between the source representation of the model 170a, 170b and target representation of the model 180a, 180b may be difficult. Exemplary embodiments may include a listing of the optimization 185a, 185b regarding one or more optimizations that may have been performed by the compiling tool 175a, 175b. Exemplary embodiments further allow information in a target representation to be mapped to a source representation.

Exemplary embodiments may use compiling tools 175a, 175b in a number of configurations, such as but not limited to, running a compiling tool within a modeling environment (e.g., a compiling tool that is integrated into the modeling environment), running a compiling tool that is external to a modeling environment (e.g., a compiling tool that is made by a first party and a modeling environment that is made by a second party), etc. By way of example, a compiling tool that is separate from a modeling environment may receive a source representation produced by the modeling environment. The compiling tool may operate on the source representation to produce a target representation, where the target representation may be an intermediate representation or a final representation.

It should be understood that the source representation of the model 170a, 170b; the complier 175a, 175b; target representation of the model 180a, 180b; and optimization notification 185a, 185b are not required to be on the same client 120 or server 150. For example, source representation 170a on client 120 may be provided to compiler 175b on server 150 to generate the target representation of the model 180b and optimization notification 185b. In instances where there are multiple instances of a modeling interface on the same client or server, the source representation of the model 170a, 170b; the complier 175a, 175b; target representation of the model 180a, 180b; and optimization notification 185a, 185b may be distributed among the multiple instances. Similarly, a compiler may be a stand-alone entity separate form the modeling environment.

The source representation of the model 170a, 170b may be a graphical, textual, or other representation, for example, an in-memory representation, of a system, such as a dynamic system. Examples of such source representations may include block diagram models, hardware descriptions, code, etc.

The target representation of the model 180a, 180b may also be a graphical, textual, or other representation of the model. Examples of such target representations include code, hardware descriptions, and block diagram models. In exemplary embodiments, the source representation and the target representation may be of the same representation of may be different.

The target representation of the model 180a, 180b may be designed to run on any processor, microprocessor, dual-core processor, multi-core processor, cluster of processors, operating system, virtual device, computational hardware device or component of a computational hardware device. In one embodiment, the target representation may comprise embedded code targeted to run on any type of embedded system. Additionally, the target representation of the model can be customized to run on a specific target hardware platform. For example, the target representation generated may include fixed-point code to nm a fixed-point processor or code can be generated to emulate fixed-point behavior on a floating-point processor.

In some embodiments, the source representation of a model 170a, 170b may include directives as to how the target representation of the model 180a, 180b should be generated. For example, elements in the source representation of the model 170a, 170b may be directed to have a corresponding function to be generated in the target representation of the model 180a, 180b with an argument list and name as directed. This function may be reused by other elements with the same functionality Conversely, a textual representation, such as code, can be read by the compiling tool 175a, 175b to create corresponding elements in a target representation of a model. That is, the source representation may be code and the resulting target representation, a graphical model. For example, an include file that contains a struct definition may be read, and a corresponding element may be created in a graphical representation of the model, or memory locations of variables in the code may be determined and a corresponding location or reference to memory locations may be provided in the target representation of the model 180a, 180b.

The listing of the optimization 185a, 185b indicates one or more optimizations were performed during compilation. Optimizations that may be performed include, but are not limited to: element insertion, element deletion, element replacement, code elimination, code addition, expression folding, loop unrolling, and function inlining, function outlining.

Simulation of a compiled model may be performed by the same environment 160a, 160b used for compilation or a separate modeling environment. The separate modeling environment may be a different instance of a modeling environment on the same device or an instance of the modeling environment on a separate device. For example, client 120 may perform the modeling and compilation of a model using a software component provided by the server 150 and send the server 150 the model for simulation. The server 150 may return the simulation results to the client 120 and the client 120 may subsequently display the data to the user with the information on the data.

Figure 2:
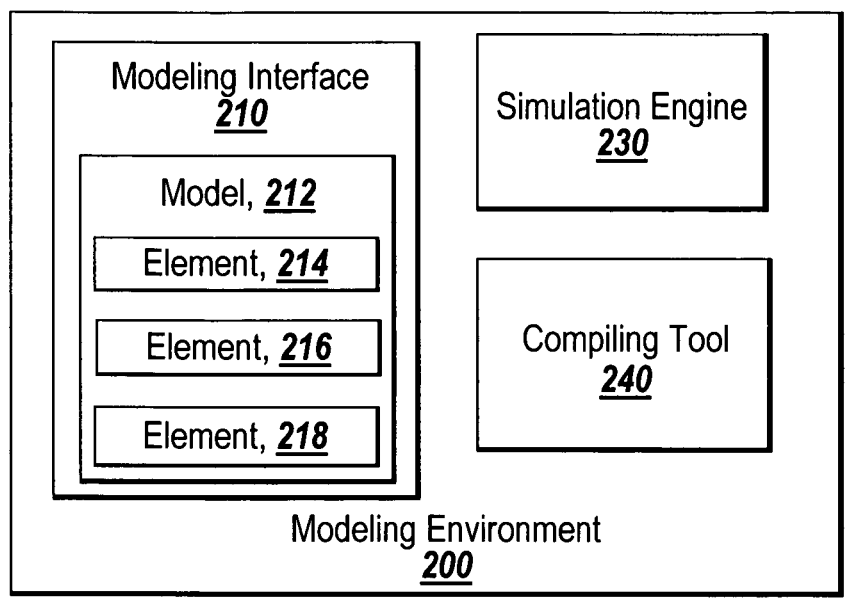
FIG. 2 depicts a high-level block diagram of an exemplary graphical modeling environment that may be used for implementing various exemplary embodiments.

FIG. 2 is an exemplary high-level block diagram that provides further description of a modeling environment, such as 160a or 160b set forth in FIG. 1. The modeling environment 200 of FIG. 2 may include a modeling interface 210, a simulation engine 230, and a compiling tool 240 (175a, 175b in FIG. 1).

The modeling environment 200 allows a user to develop source representations of models in the modeling interface 210. The modeling interface 210 can be a textual or graphical modeling interface (e.g., a graphical user interface). Using the modeling interface 210, a user may create a source representation of a model 212 that includes elements 214, 216 and 218. The representation of the model 212 that is created with the modeling interface 210 may represent a model of a system. The user may use predefined elements or user-defined elements to develop a model.

An exemplary embodiment will be described relative to a time-based block diagram modeling environment, such as the Simulink® environment from The MathWorks, Inc. of Natick, Mass. Other embodiments are not limited to the time-based block diagram modeling environment, and may include other graphical modeling environments. Examples of graphical modeling environments include, but are not limited to, a discrete-event system modeling and simulation environment, such as the SimEvents® environment from The MathWorks, Inc., of Natick, Mass., a dataflow modeling and simulation environment, such as those provided by LabVIEW® from National Instruments Corporation of Austin, Tex., a state-based and flow diagram modeling and simulation environment, such as the Stateflow® environment from The MathWorks, Inc., of Natick, Mass. or any graphical tools that provide a signal-based modeling environment. Further examples of graphical modeling environments that may be used to develop and/or execute a graphical model in accordance with exemplary embodiments include, but are not limited to, LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC.Software Corporation, Rhapsody® from iLogix, Inc., Rational® from International Business Machines Corporation, ARTiSAN Studio from ARTiSAN Software Tools, Inc., SCADE® from Esterel Technologies, Inc., among others. Exemplary embodiments can also be used in a text based environment, such as a text based modeling and/or text based programming environment. Text-based programming environments may include Mathematica® from Wolfram Research, Inc., Maple® from Maplesoft, a division of Waterloo Maple Inc., Scilab® from The French National Institution for Research in Computer Science and Control (INRIA), Le Chesnay Cedex, France, etc.

An exemplary embodiment may extend techniques of graphically highlighting information to text-based programming environments, such as the MATLAB® environment. An exemplary embodiment may highlight lines of text-based programs to provide fixed-point information relating to the highlighted lines. Exemplary embodiments may employ various techniques for performing graphical highlighting, such as different font colors, different background colors, different font style, different font size, underlining, bolding, italicizing, fading, semi transparency, etc., to provide information. Highlighting may refer to techniques for emphasizing or making prominent information, such as a variable, operation, function, etc. in a textual or graphical environment.

An exemplary embodiment may provide information upon a focus event, for example, upon a mouse-over event, regarding fixed-point information of the line or lines that have received focus, for example by moving the pointing device over them. The focus information may be provided in, for example, a popup, a tooltip, a dedicated separate window, a specific area on the model canvas, etc. In one embodiment, an editor of a text-based programming environment may provide these capabilities.

The simulation engine 230, of the modeling environment 200, communicates with the modeling interface 210. The simulation engine 230 can receive a representation of a model, such as a graphical representation of a model like a block diagram model or state diagram model, that is generated using the modeling interface 210 and can simulate the model.

The compiling tool 240 may be used to convert the source representation of a model 112 to a target representation of the model. Examples of possible outputs of compiling tool 240 may include, but are not limited to, generation of code, such as a hardware description, source code, object code, a compiled executable, or library, for forming an executable of a graphical model provided by the graphical modeling interface 210.

The compiling tool 240 may include a compiler such as Real-Time Workshop® from The MathWorks, Inc. of Natick, Mass., Simulink® HDL Coder from The MathWorks, Inc. of Natick, Mass., or another type of application (e.g., a software based application, a hybrid application that is based on software and hardware, etc.) that may be necessary to generate a target representation. Examples of target representations include, but are not limited to, executable code, instructions, etc. in a programming language. Programming languages may include, but are not limited to Java, C, C++, Python, etc. In other embodiments the programming language may be a hardware description language such as Verilog or VHDL. To generate a target representation of the model, the compiling tool 240 may convert a source model language representation of a graphical model to a target language representation of the model. The compiling tool 240 may also be used to generate a hardware description language representation of the model.

The compiling tool 240 may generate source code for the execution of a model that is provided in the source representation by the modeling interface 210. The compiling tool 240 may also be used to compile the original source code representation into object code. In other embodiments, the compiling tool 240 is used to build an executable program, library or any other form of executable instructions.

The components of the graphical modeling environment 200 may be provided on the same computing device, as described below with reference to FIG. 3. In another embodiment the components of the graphical modeling environment 200 may be coupled to each other via a communication network, such as described above with reference to FIG. 1. In still other embodiments, the components of the graphical modeling environment may be configured, coupled, arranged, etc., in still other ways.

Figure 3:
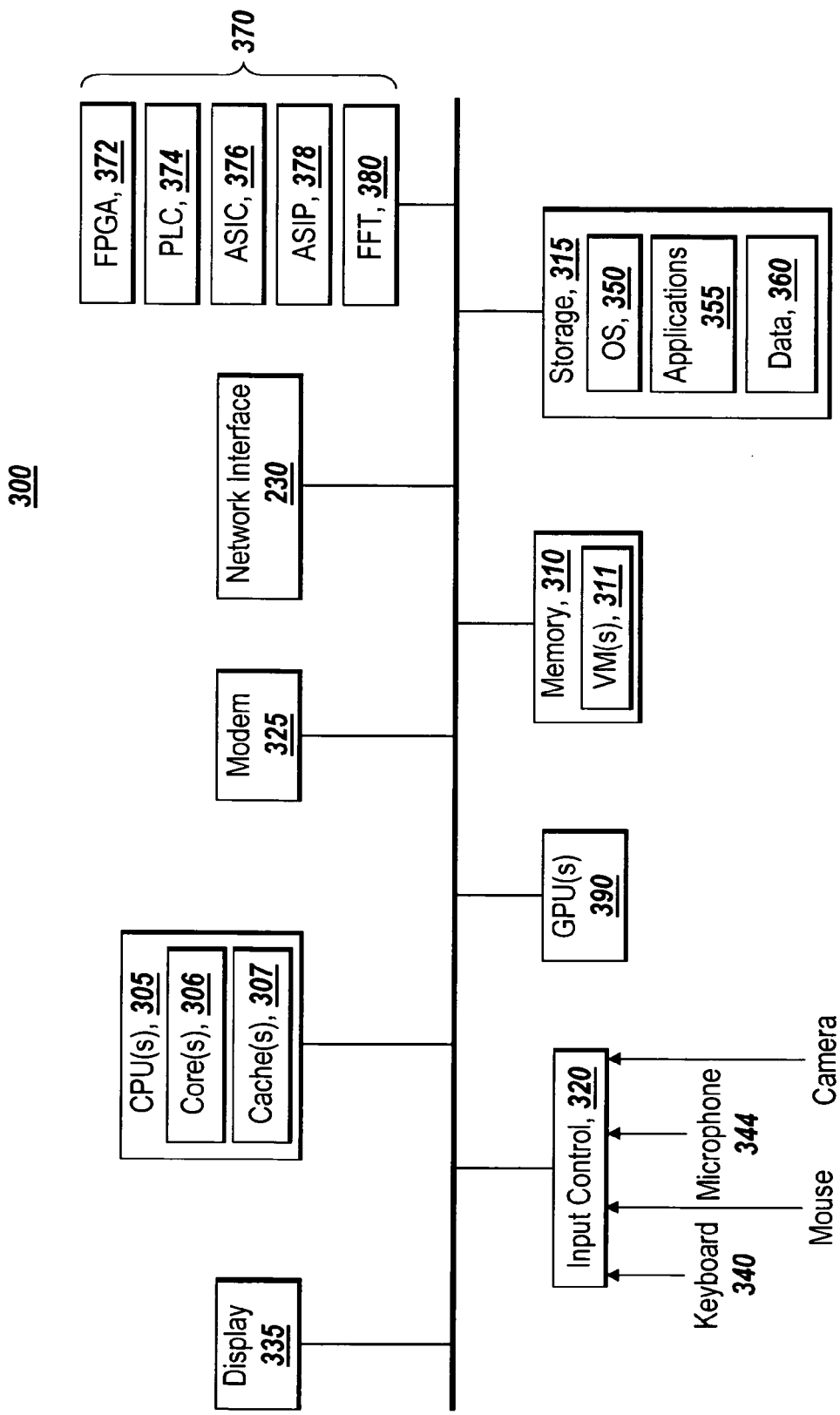
FIG. 3 depicts an exemplary computing device suitable for practicing exemplary embodiments.

FIG. 3 is an exemplary computing device 300 suitable for practicing exemplary embodiments. The computing device 300 is intended to be illustrative and not limiting. The computing device 300 may take many forms, including but not limited to a personal computer, workstation, server, network computer, optical computer, Internet appliance, mobile device, a pager, a tablet computer, etc. Clients 120 and 130 as well as servers 140 and 150 from FIG. 1 are examples of computing devices.

The computing device 300 may be electronic and may include a Central Processing Unit (CPU) 305, memory 310, storage 315, an input control 320, a modem 325, a network interface 330, a display 335, hardware 370, a graphical processing unit 390 (GPU). The CPU 305 may control components of the computing device 300 to provide the modeling interface 210, simulation engine 230, and/or compiling tool 240. The memory 310 temporarily stores instructions and data and provides them to the CPU 305 so that the CPU 305 operates the computing device 300 and may run the modeling interface 210, simulation engine 230, and/or compiling tool 240 based on the stored instructions.

Optionally, the computing device 300 may include multiple CPUs 305 for executing software loaded in the memory 310, and other programs for controlling system hardware. Each of the CPUs 305 can have one or more cores 306, one or more caches 307, and/or may operate with one or more threads.

The code loaded in the memory 310 may run in a virtualized environment, such as in a Virtual Machine (VM) 211. Multiple VMs 311 may be resident on a single processor.

Also, at least part of the application can be run in hardware 370, which may include, for example, a field programmable gate array (FPGA) 372, programmable logic controller (PLC) 374, an application specific integrated circuit (ASIC) 376, an application specific instruction set processor (ASIP) 378, a Fast Fourier Transform (FFT) processing devices 380, etc. Further, the part of the applications may be run on analog electronic devices or other resources may be used to run part of the application, such as graphics processing units (GPUs) 390.

Storage 315 may contain software tools for applications. Storage 315 may include code for the operating system (OS) 350 of the device 300, code for applications 355 running on the operation system including the applications for the modeling interface 210, simulation engine 230, compiling tool 240 and data 360 generated from the modeling interface 210, simulation engine 230, and compiling tool 240. Those of ordinary skill in the art will appreciate that parts of the applications may be stored in the CPU cache 307 or memory 310 or they can be stored elsewhere, such as on a remote storage device.

The input control 320 may interface with a keyboard 340, a mouse 342, a microphone 344, a camera 346, such as a web camera, a motion sensor, a touch screen, and other input devices. The computing device 300 may receive, through the input control 320, input data, such as the input data for developing a model. The computing device 300 may display on the display 335 user interfaces for displaying the data generated from the modeling interface 210, simulation engine 230, and code building tool 240.

Figure 4:
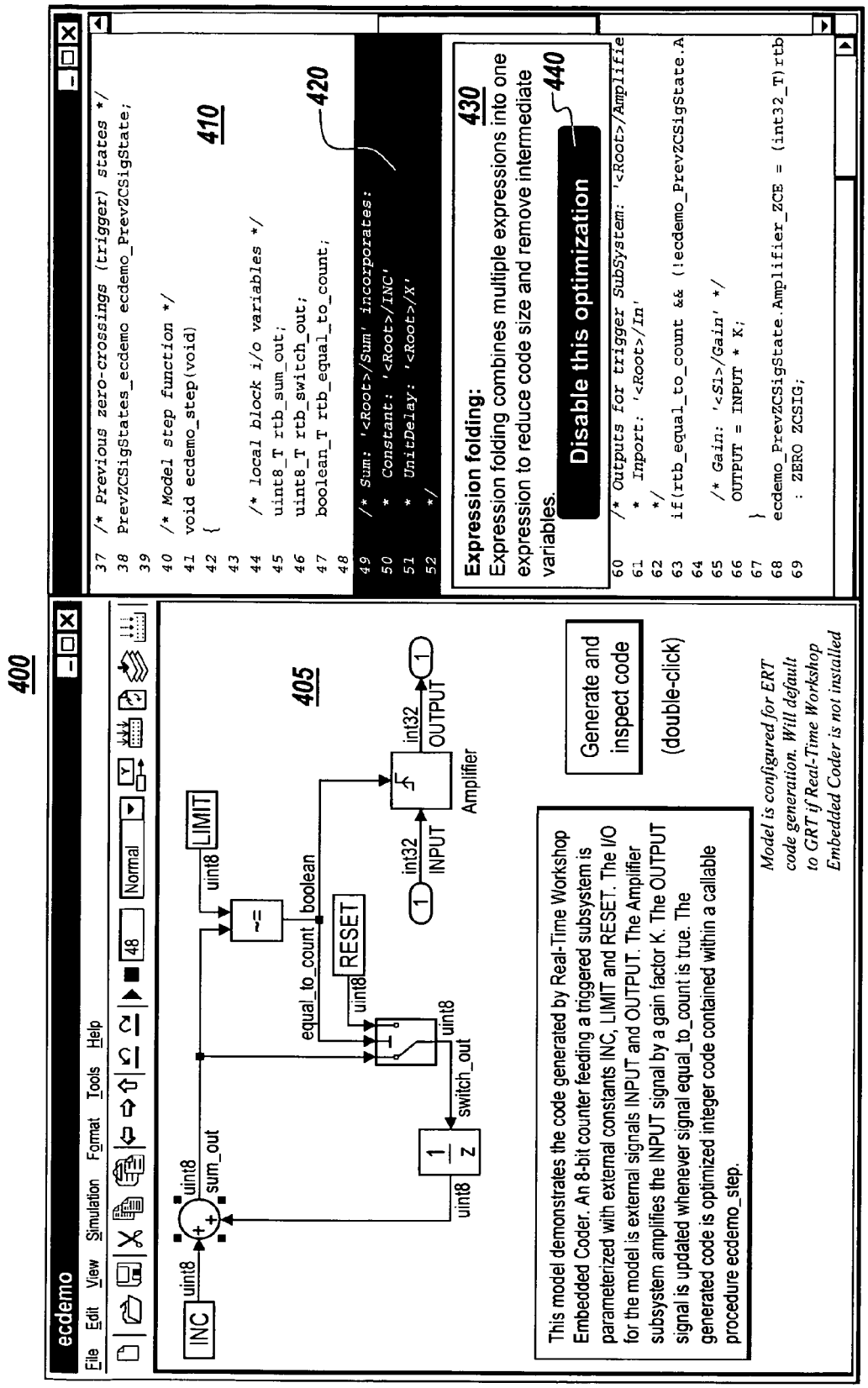
FIG. 4 depicts an exemplary integrated environment for viewing a source representation of a model, a target representation of a model, and a listing of the optimization performed.

FIG. 4 shows an example of an integrated environment 400 displaying a source representation of a model in conjunction with a target representation of the model, including a indicator associated with a listing of the optimization, that are generated when the source representation is compiled. In this example, the source representation of the model is a graphical representation 405 displayed in a frame on the left side of the integrated environment 400. The graphical representation of the model 405 is a block diagram model created using Simulink®.

In the example of FIG. 4, the target representation is code 410 generated from the compilation of the graphical representation of the model 405. The generated code 410 is displayed in a frame on the right side of integrated environment 400. The generated code 410 of this example is the code generated using the Real-Time Workshop® Embedded Encoder available from The MathWorks, Inc. of Natick, Mass. Other embodiments may use other display configurations without departing from the spirit of the invention.

In the example of FIG. 4, an indicator 420 associated with the listing of the optimization is incorporated into the code 410. In this example, the indicator 420 is designated by highlighting a section of the code 410. In other embodiments the indicator may not be highlighted. A user may be able to view the listing of the optimization and other information about the optimization 430 by activating the indicator 420. Activating the indicator may involve actively selecting the indicator by right clicking the indicator. In other embodiments, the indicator 420 may be a dynamic indicator that is activated upon a focus event, for example, upon a mouse-over event. Upon activation of the indicator 420, the listing of the optimization 430 may be displayed.

The listing of the optimization may be included as part of the target representation. For example, the listing of the optimization may be provided as meta-data incorporated in the target representation. Thus when the indicator is activated, the listing of the optimization may be displayed as a popup, a tooltip, a window, or a specific area on the representation, etc.

In certain embodiments, the listing of the optimization 430 may include additional information or options. In this example, the user is further provided with the option of whether the optimization should be implemented via a button selection 440. In the example, of FIG. 4, the optimization is Expression Folding. Expression Folding is an optimization that combines multiple operations into a single statement in the code 410.

FIG. 5 shows another example of an integrated environment 500 displaying an alternate source representation of the model in conjunction with the targeted representation of the model. In this example, the system being modeled in FIG. 5 is the same as in FIG. 4. A primary difference is the format of the source representation. In this example, the source representation of the model is a textual representation 505 displayed in a frame on the left side of the integrated environment 500.

Similar to FIG. 4, the target representation of FIG. 5 is code 510 generated from the compilation of the textual representation of the model 505. The generated code 510 is displayed in a frame on the right side of integrated environment.

As with FIG. 4, in FIG. 5 an indicator 520 associated with a listing of the optimization is incorporated into the code 510. In this example, as in FIG. 4, the indicator 520 is designated by highlighting a section of the code 510. In certain embodiments, a user may be able to view listing of the optimization and other information regarding the optimization 530*by* activating the indicator 520. The user may also be provided with the option of whether the optimization should be implemented via a button selection 540.

In some embodiments, one or more listings of optimizations may be provided together via a data structure (e.g., a file, object, piece of code, etc.) separate from the target representation. In one such example, the separate data structure may be a log file of what optimizations were performed at what point in the compilation resulting in the target representation. This provides a user with a description of what optimization was performed during compilation that resulted in the target representation of the model.

Figure 6A:
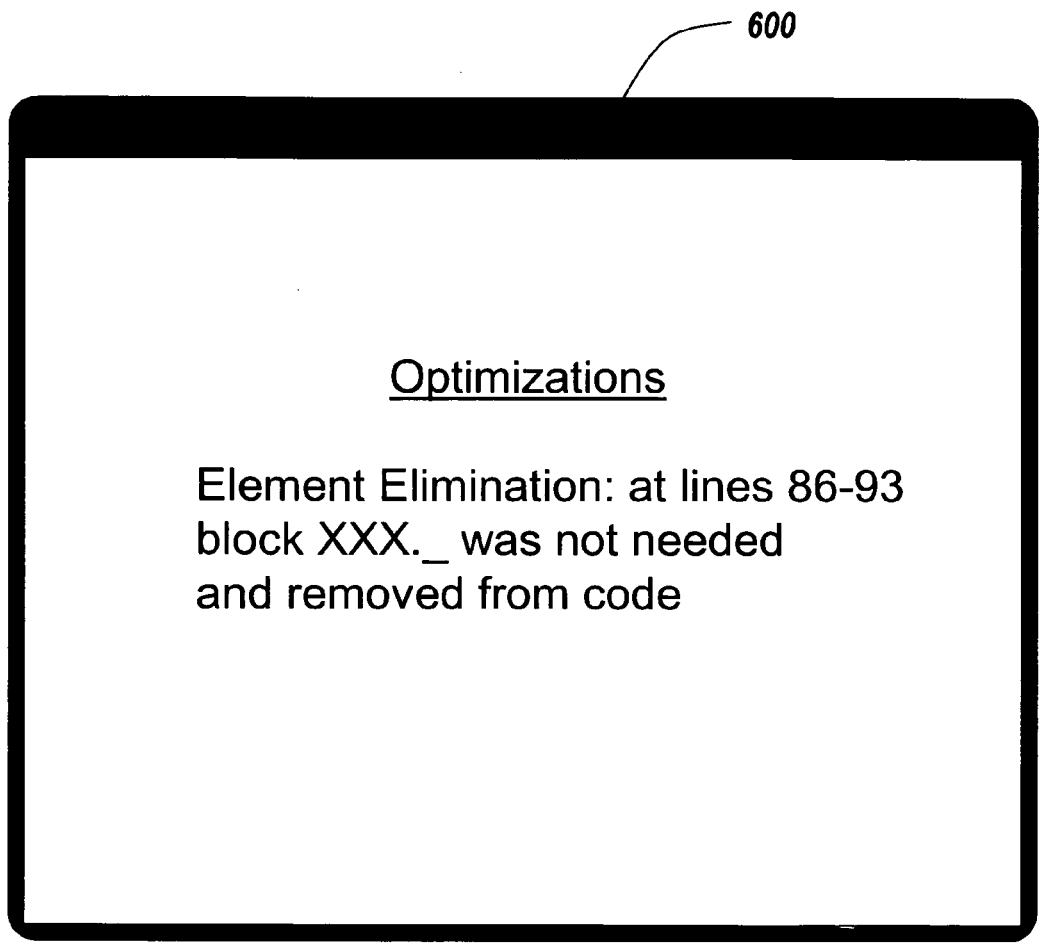
FIG. 6A depicts an exemplary embodiment of listings of optimizations consisting of log file.

In FIG. 6A, the provided optimization information is a log file 600. In this example, the log file indicates an element of the source representation of the model was eliminated in lines 86-93 of the generated code. This log file may be displayed when an indicator in a target representation is activated, such as shown in FIGS. 4 and 5.

Figure 6B:
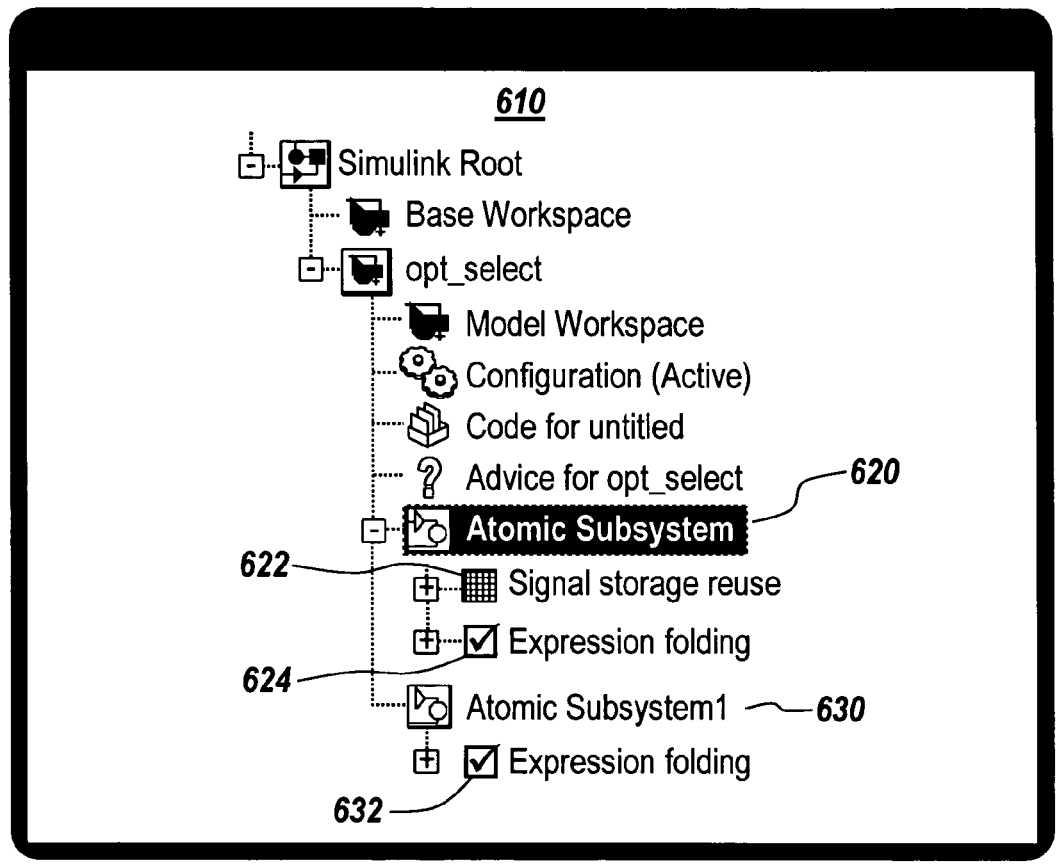
FIG. 6B depicts an exemplary embodiment of listings of optimizations provided in a model hierarchy.

In another embodiment, the listings of optimizations may be viewed in a model hierarchy browser. An example of this can be seen in FIG. 6B. In this example, the hierarchy of a model 610 named opt_select is shown. The hierarchy of the model 610 includes two atomic subsystems, "Atomic Subsystem" 620 and "Atomic Subsystem1" 630. Checkboxes 622, 624, and 632 may be associated with subsystems 620 and 630 to indicate possible optimizations. Inside "Atomic Subsystem" 620, two optimizations are potentially effected in the target representation, 'Signal storage reuse' 622 and 'Expression folding' 624. In the present example, 'Expression folding' 624 is selected to be effected. In Atomic Subsystem1, only 'Expression folding' can be effected in the target representation and this optimization is selected In some instances, optimizations may be mutually exclusive optimizations. In such instances, the checkboxes may be disabled accordingly or radio buttons could be employed. Other schemes and configurations are also possible.

As discussed above, the target representation may be provided with an indicator. The indicator may include links such as embedded code or tags which provide or reference to a listing of the optimization. An indicator may provide a selectable connection for navigating between the target representation and the listing of optimization. An example of a selectable connection is a hyperlinked word or picture that can be selected by the user resulting in the immediate delivery and view of another file. In other embodiments, the indicator may be a dynamic indicator that is activated upon a focus event, such as a mouse-over event.

Similarly, in certain embodiments, listings of optimizations may contain an indicator associated with a target representation. When an indicator is activated, a corresponding target representation may be displayed. In still further embodiments, an indicator may be to a specific segment of the target representation. Thus, when the indicator is activated, the corresponding segment of the target representation is displayed. In certain embodiments the corresponding segment may be graphically designated in the display.

Indicators may be used to provide a user with a way to discern those portions of the target representation that are associated with the listing of the optimization. For example, a portion, section or element may be highlighted; change color; flash; become underlined, italicized or be bolded. Indicators may also include an arrow, or any other marker. In some embodiments, the portion, section or element may be encompassed by a shape. Examples of possible shapes include, but are not limited to, a rectangle, square, circle or oval. The border of such shapes may be any color or highlighted and the interior of which may be shaded in any color or pattern. Such indicators provide notification that an optimization was performed that resulted in a portion of the target representation of the model.

FIG. 7 shows one embodiment of an indicator 710 associated with a listing of the optimization that is graphically designated in a target representation. In the example of FIG. 7, the target representation is generated code 700. The indicator 710 is graphically designated by highlighting a section of the code 700. When this indicator 710 is activated, the listing of the optimization and additional information regarding the optimization 720 is displayed. In this example, the listing of the optimization 720 discloses that the optimization performed was expression folding.

Selection of elements, portions, indicators, or buttons may be performed via a graphical user interface using any number of input devices. For example, a user may use a mouse 342 to select an element, portion, indicator or button being displayed.

As discussed previously, the listing of the optimization 720 may further allow a user to specify whether the optimization should be implemented. In the example of FIG. 7, the user is provided with the option of disabling the optimization. In this example, a button 730 is provided at part of the listing of the optimization 720 that disables the optimization.

Figure 8A:
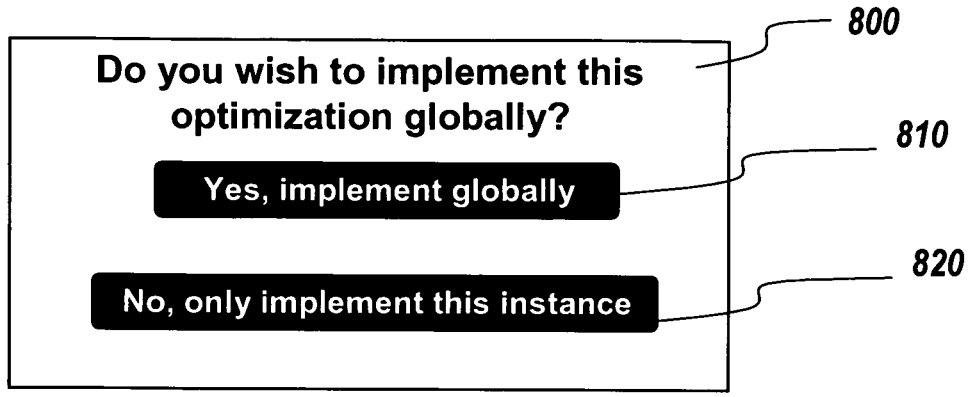
FIGS. 8A and 8B depict exemplary embodiments of menu screens that provide implementation options for an exemplary optimization.

In certain embodiments a user may be able to further specify whether an optimization should be implemented locally at a specific instance in the target representation or globally throughout the target representation. An example of this can be seen in FIG. 8A. FIG. 8A depicts a pop-up screen 800 providing the user with the ability to choose whether an optimization is to be implemented globally (button 810) or locally (button 820). Selecting button 810 implements the optimization at every instance the optimization is to be performed. Selecting button 820 implements the optimization at the specific instance selected.

Figure 8B:
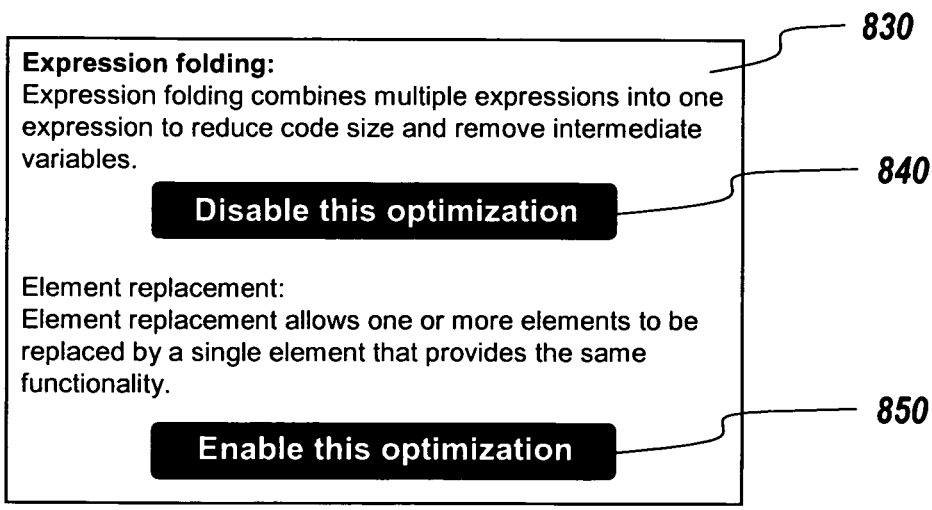

In other embodiments, alternate optimizations may be displayed to allow the user to select between possible optimizations. An example of this can be seen in FIG. 8B. FIG. 8B depicts a pop-up screen 830 providing the user with the ability to choose whether an optimization is to be implemented (button 840) or if an alternate optimization should be performed (button 850).

In certain embodiments the screen 800 may include additional information that identifies how many occurrences in the target representation are affected by the optimization or how many classes of occurrences are affected (for example, in the context of summation only, in the context of output computations only, in the context of initialization computation, in a particular part of the model hierarchy, with respect to input or output variables only, etc.). The screen 800 may also contain an implement/next query to quickly move from one optimization occurrence to another. If an optimization is selected to be implemented, after the implementation is effected, it can be moved to the next occurrence of an optimization (the same type of optimization or another). Likewise, if the optimization is not to be implemented, a next option moves to a next optimization. Other options such as moving to a previous optimization, performing an undo on an optimization, etc., are possible as well.

Figure 9:
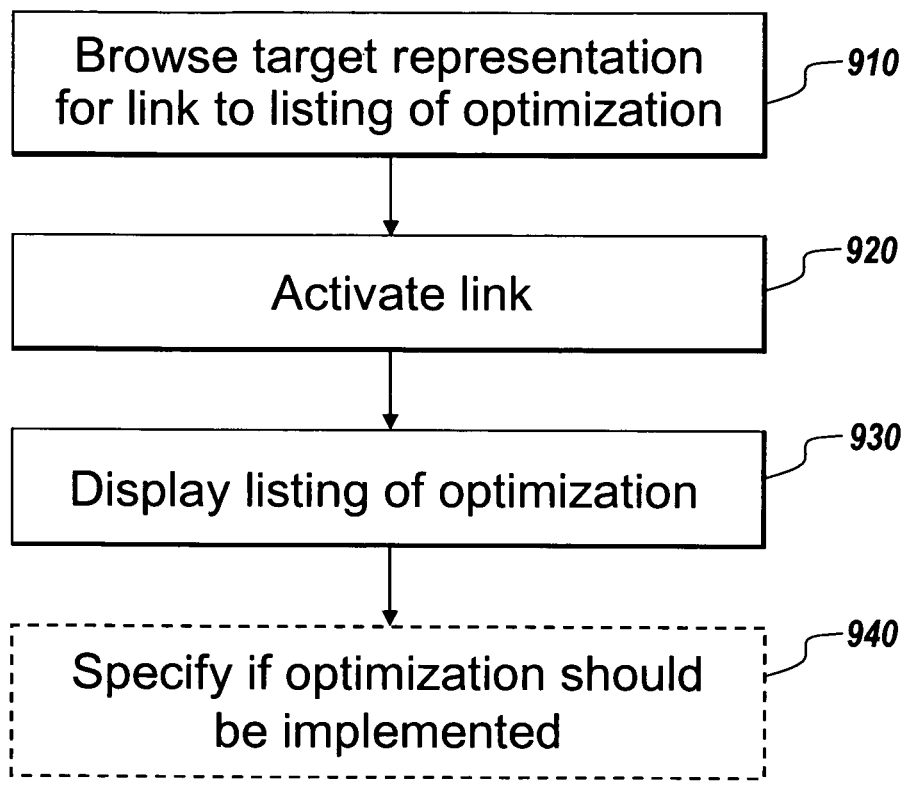
FIG. 9 is a flow diagram that depicts exemplary processing for reviewing a listing or the optimization provided in a target representation of a model of a system.

FIG. 9 depicts a flow diagram 900 of an example of navigation between a target representation of a model and a listing of the optimization in FIG. 7. In this example, a user browses the target representation to locate an indicator 710 associated with a listing of an optimization (step 910). The desired indicator may then be activated (step 920) via the graphical user interface. For example, the user may use a mouse to select an indicator 710. The listing of the optimization 720 is then displayed (step 930). In this example an option for specifying whether an optimization should be implemented 730 is also provided (step 940).

While the example of FIG. 9 deals with the navigation between a target representation of a model and a listing of the optimization, still further advantages may be obtained by providing the ability to navigate between the target representation of the model, listings of the optimization, and the source representation of the model.

Figure 10:
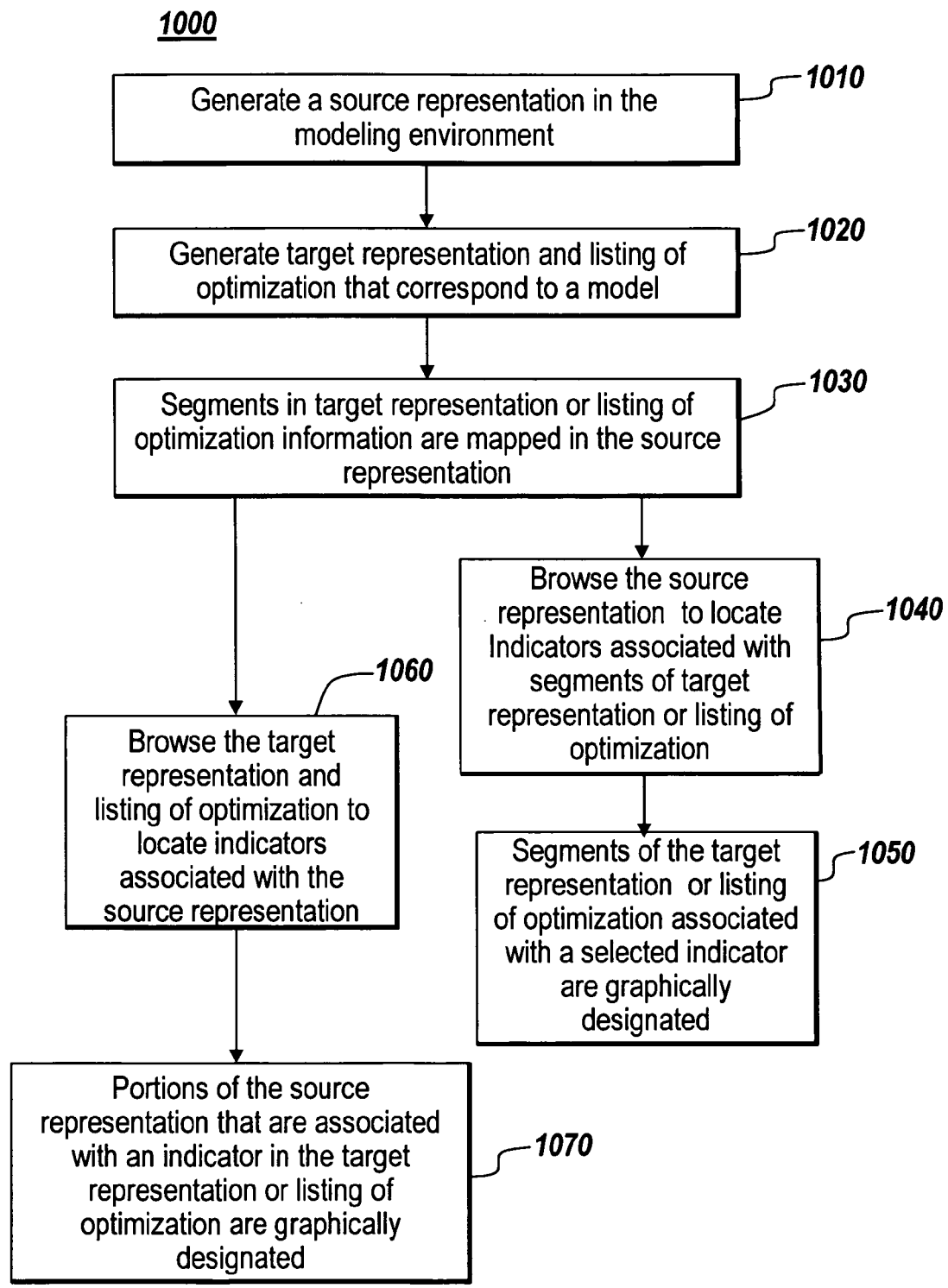
FIG. 10 is a flow diagram that depicts an exemplary process for providing traceability between a source representation of a model, a target representation compiled from the source representation, and the listing of the optimization performed during the compilation.

FIG. 10 is a flow diagram for an example that illustrates traceability between a source representation of a model, a target representation of the model, and optimization information generated from the source representation of the model. In FIG. 10, a user creates the source graphical representation of the model in the modeling environment 160a, 160b, and 200 (step 1010). The source representation of the model that is created may be executable in the modeling environment and may represent a system, such as a dynamic system. The source representation of the model is represented by a source model language, such as, for example, MATLAB® software or Simulink® software from The MathWorks, Inc of Natick, Mass.

The compiling tool 175a, 175b, and 240 generates a target representation and a listing of the optimization that corresponds to the source representation of a model (step 1020). The compiling tool 175a, 175b, and 240 converts the source model language of the source representation of the model to a target language representation of the model. For example, the compiling tool 175a, 175b, and 240 may generate the target representation of the model in a programming language, such as C, C++, Java, etc. Alternatively, the compiling tool 175a, 175b, and 240 may generate code in a hardware description language, such as Verilog or VHDL. The compiling tool 175a, 175b, and 240 also generates information regarding any optimization performed in the generation of the code.

The target representation of the model that is generated by the compiling tool 175a, 175b, and 240 may be compiled and executed external to the modeling environment 160a, 160b, and 200. For example, the target representation may be compiled and executed on a target processor to implement the functionality of the model.

Portions of the target representation of the model and the listing of the optimization is mapped to one or more indicators in the source representation of the model (step 1030).

Indicators are provided to associate portions of the source representation of the model with the portions in the target representation and the listing of the optimization. The target representation of the model may be provided with corresponding indicators which reference to indicators in the source representation of the model. Each indicator in the source representation of the model that corresponds to the target representation of the model or the listing of the optimization is referenced within the target representation of the model or listing of the optimization with a corresponding indicator.

Thus, the user can select indicators in the source representation of the model to locate corresponding segments of the generated target representation of the model or optimization information (step 1040). Upon selecting an indicator in the source representation of the model, portions of the generated target representation of the model or a listing of the optimization associated with the selected indicator can be displayed and/or graphically designated (step 1050). Alternatively, upon selecting a an indicator in the target representation of the model or a listing of the optimization, portions of the source representation of the model that are associated with the selected portion of the target representation of the model or listing of the optimization can be displayed and/or graphically designated, (step 1070).

The user can browse the target representation of the model and a listing of the optimization to locate associations with the source representation of the model (step 1060). Alternatively, the user can select an indicator in the source representation of the model to locate corresponding portions of the target representation of the model or listing of the optimization (step 1050). Upon selecting an indicator in the source representation of the model, portions of the target representation of the model or listing of the optimization that are associated with the selected indicator can be displayed and/or graphically designated (step 1050). Alternatively, upon selecting a portion of the target representation of the model or optimization information, portions of the source representation of the model that are associated with the selected portion of the target representation of the model or optimization information can be graphically designated (step 1070).

Figure 11:
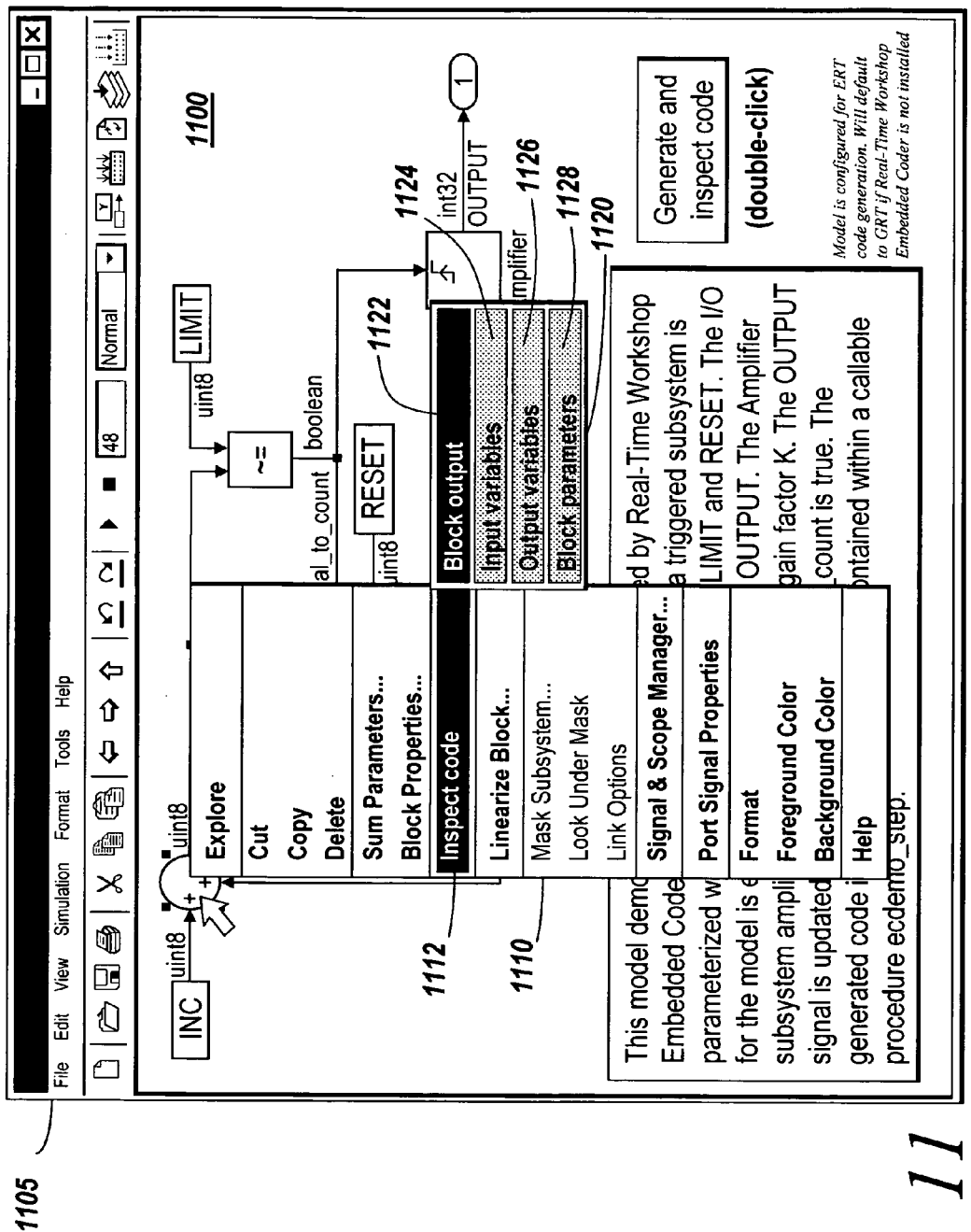
FIG. 11 depicts and exemplary user interface for navigating between a source representation of a model, a target representation of the model and the listing of the optimization.

FIG. 11 is an example of a menu 1110 that allows the user to specify portions of a target representation that the user wants to locate. To bring up the menu, the user right clicks on the source representation or the model. In the present example, the source representation of the model is a graphical representation 1100.

Alternatively, a user may select the "Tools" button from the menu bar 1105. The menu 1110 provides an "Inspect code" option 1112 that allows a user to specify which portions of the target representation of the model are graphically designated when an element in the graphical representation 1100 is selected. For example, if the user selects the "Inspect code" option 1112, a submenu 1120 may be displayed that allows the user to select the portions of code of the target presentation of the model that are graphically designated.

The submenu 1120 can also include a "Block output" option 1122, an "Input variables" option 1124, an "Output variables" option 1126 and a "Block parameters" option 1128. If the user selects the "Block output" option 1122, only segments of the code of the target representation of the model that correspond to the block output of a selected element of the graphical representation of the model 1100 are graphically designated. If the user selects the "Input variables" option 1124, only segments of the code of the target representation of the model that correspond to input variables of a selected element of the graphical representation of the model 1100 are graphically designated. If the user selects the "Output variables" option 1126, only segments of the code of the target representation of the model that correspond to output variables of a selected element of the graphical representation of the model 1100 are graphically designated. If the user selects the "Block parameters" option 1128, only segments of the code of the target representation of the model that correspond to block parameters of a selected element of the graphical representation of the model 1100 are graphically designated.

Thus, from a source representation of a model, a user may access a listing of the optimization. In certain embodiments, a user may query a portion of the graphical representation 1100, such as a block, signal, group of blocks, group of signals, or any combination thereof and investigate whether there is an optimization associated with the selected portion of the source representation of the model. Likewise, from a target representation of a model, a user may access a listing of the optimization. In certain embodiments, a user may query a portion of the code, such as operator, an operand, code line, or a code segment to investigate whether there is an optimization associated with the selected portion of the target representation of the model.

Figure 12B:
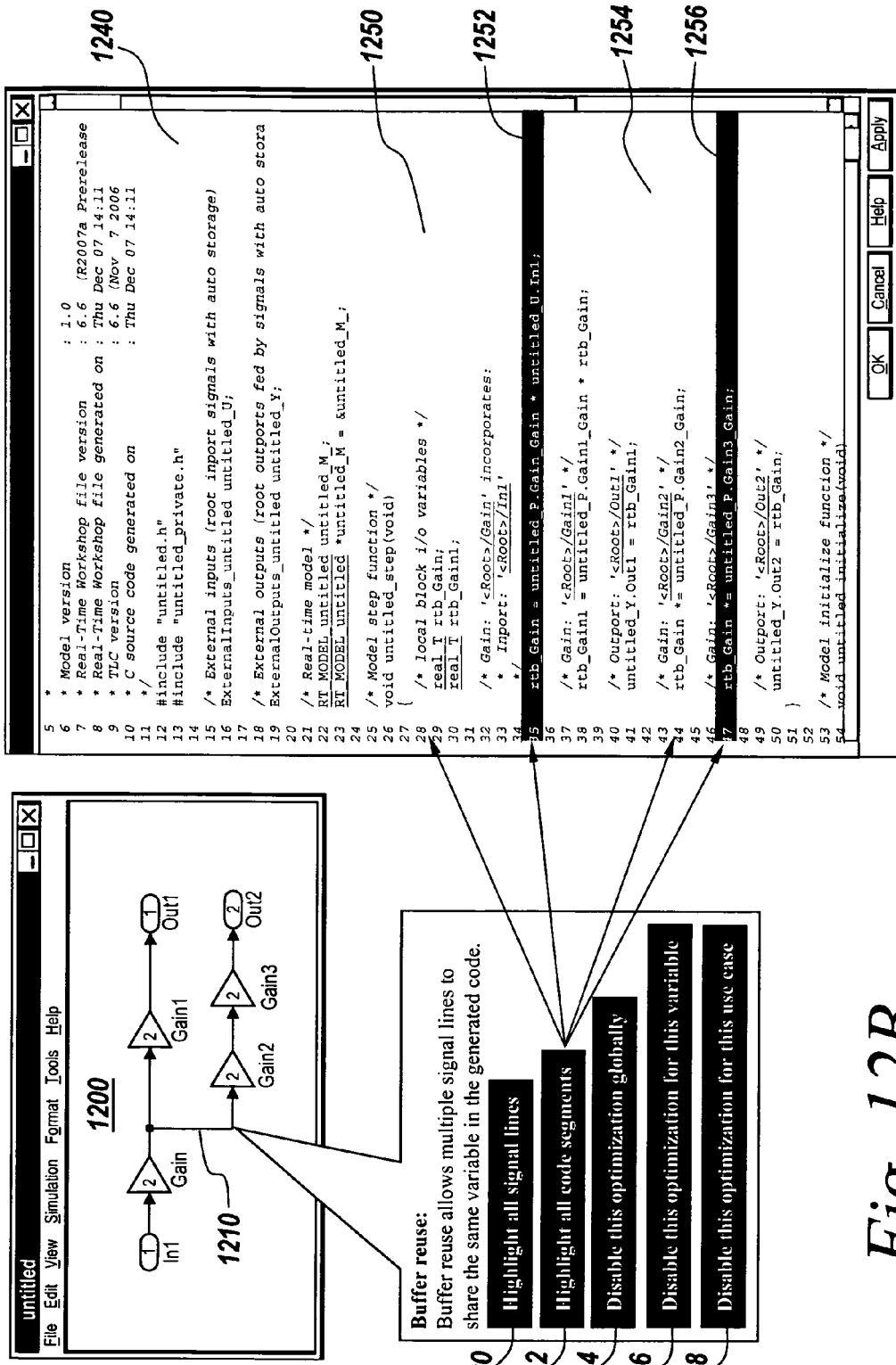

An example of the interaction between the source representation, the target representation, and a listing of the optimization can be seen in FIGS. 12A and 12B. FIGS. 12A and 12B show a source representation of a model with the corresponding target representation of the model. In the embodiments of FIGS. 12A and 12B, the source representation of the model is a graphical representation 1200. The target representation of the model is code 1240 compiled from the graphical representation of the model. In the example of FIG. 12A, the listing of the optimization 1260 is accessed via the code 1240. In FIG. 12B, the listing of the optimization 1220 is accessed via the graphical representation 1200. The optimization performed in the embodiments of FIGS. 12A and 12B is Buffer (signal) reuse. Buffer reuse allows multiple signals to share the same variable in the generated code 1240.

In FIG. 12A, the listing of the optimization 1260 is accessed by selecting an associated instance of a signal "rtb_gain" 1250 in the code 1240. As discussed previously, the user may be provided with control over the level of optimization performed. In the example of FIG. 12A, the listing of the optimization 1260 provides this control via a series of buttons 1274, 1276, and 1278. Button 1274 allows the user to specify whether the optimization should be applied globally throughout the system. Button 1276 allows the user to specify whether the optimization should be applied to a specific variable. Button 1278 allows the user to specify whether an optimization should be applied for a specific use case. The buttons of FIG. 12A are examples of techniques that can be used to access, identify, specify, select, etc., optimization information. Other embodiments may use other techniques to interact with a user.

In FIG. 12B, the listing of the optimization 1220 is accessed by selecting an associated signal 1210 of the graphical representation 1200. As in FIG. 12A, the user may be provided with control over the level of optimization performed. In the example of FIG. 12B, the listing of the optimization 1220 provides this control via a series of buttons 1234, 1236, and 1238. Button 1234 allows the user to specify whether the optimization should be applied globally throughout the system. Button 1236 allows the user to specify whether the optimization should be applied to a specific variable. Button 1238 allows the user to specify whether an optimization should be applied for a specific use case.

In certain embodiments, the user may also be allowed to specify the visual designation of an optimization in the source and target representations of a model. In the Example of FIG. 12A, the information 1260 regarding the optimization notification further provides buttons 1270 and 1272. Selecting button 1270 highlights the signals in the graphical representation 1200 that are affected by the optimization. Selecting button 1272 highlights the segments of the code 1240 affected by the optimization. In this example, button 1270 has been selected, wherein the affected signals 1210, 1212, and 1214 of the graphical representation 1200 are highlighted.

In the Example of FIG. 12B, the listing of the optimization 1220 further provides buttons 1230 and 1232. Selecting button 1230 results in the highlighting of the signals in the graphical representation 1200 that are affected by the optimization. Selecting button 1232 highlights the segments of the code 1240 affected by the optimization. In this example, Button 1232 has been selected, wherein the affected segments of code 1250, 1252, 1254, and 1256 of the code 1240 are highlighted.

In certain embodiments, optimizations performed during the generation of the target representation of a model may result in the addition or elimination of functionality that may not be depicted in the corresponding source representation of the model. For example, the elements of the code in the target representation of the model that would correspond to a particular element of the graphical representation may be entirely eliminated by an optimization. In such cases, the corresponding the code may be provided with an indicator associated with the listing of the optimization. The listing of the optimization may indicate what code was eliminated and for what reason.

In some embodiments, the source representation of a model may be updated to reflect changes in the target representation of the model because of optimization. For example, if a portion of the target representation corresponding to an element of a source representation of the model is eliminated by optimization, the element may be deleted from the source representation of the model to reflect the optimization. Conversely, if a portion that would correspond to a new element is added during optimization, then the corresponding element can be added to the source representation of the model. The added element may be associated with the added portion of the target representation of the model wherein activation of the indicator of the association displays a listing of the optimization.

In certain embodiments, the editing of the source representation may be user selected. For example, the user may be provided with the option of updating the corresponding graphical representation to reflect an implemented optimization. As with the selection of whether to implement the optimization, the selection to update the source representation may also be performed locally for a specific instance or globally throughout a model. In embodiments where multiple optimizations are provided for a user to select, the user may also select to update the source representation of the model accordingly as well.

Figure 13:
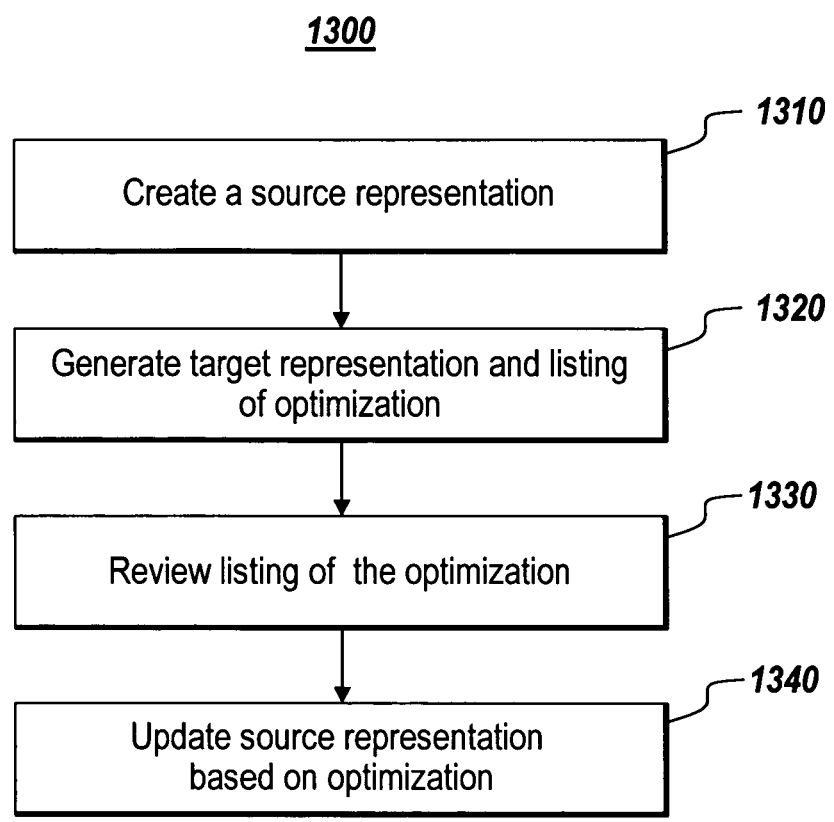
FIG. 13 is a flow diagram that depicts an exemplary process for round trip editing of a target representation and the source representation of the model.

FIG. 13 is a flow diagram 1300 that illustrates the process for such round-trip editing. A user can develop a source representation of a model (step 1310). A target representation of the model and listing of the optimization may then be generated from the source representation of the model (step 1320). The information provided by the listing of the optimization may then be reviewed (step 1330). The source representation of the model may also be updated to reflect the optimization (step 1340). Only the portion of the source representation of the model that corresponds to the optimization is updated. This allows a user to edit the source representation of the model with a minimal disturbance to the source representation of the model. Examples of this can be seen in FIGS. 14 and 15.

Figure 14:
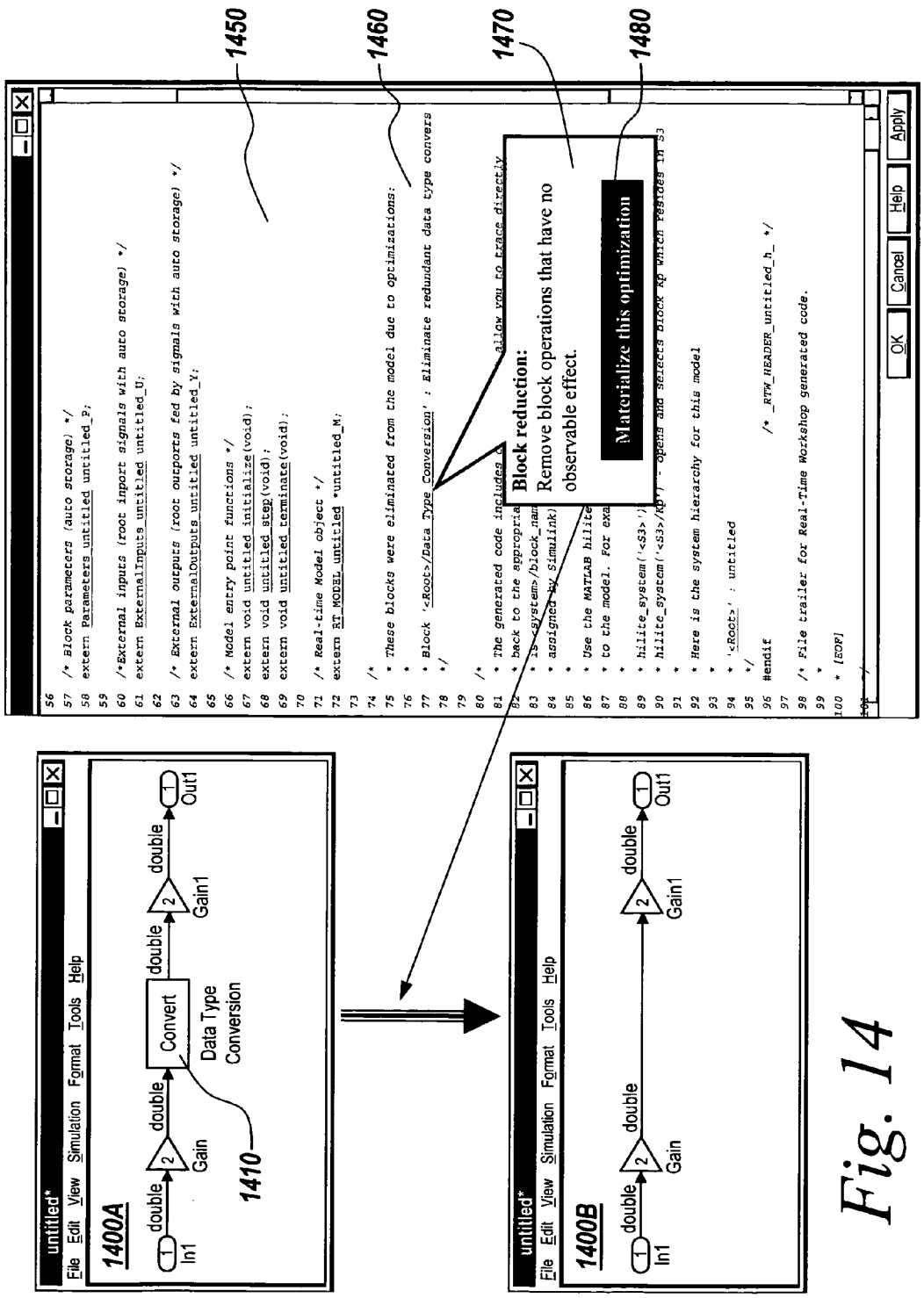
FIG. 14 depicts one embodiment of an exemplary integrated environment wherein an optimization in the target representation is reflected in the source representation.

FIG. 14 depicts an example of an optimization in the target representation of a model that may be reflected in the source representation of the model. In the example of FIG. 14, source representations of the model are displayed with the corresponding target representation of the model. In this example, the source representations of the model are graphical representations 1400A and 1400B. The target representation is code 1450. An indicator 1460 associated with the listing of the optimization 1470 is provided in the code 1450. The optimization relates to block 1410 in graphical representation 1400A. The optimization performed is block reduction as indicated by the listing of the optimization 1470. In the present example, block 1410 was not providing an observable effect on the system and was removed from the corresponding code 1450.

As discussed previously, in certain embodiments, the user may be provided the ability to select whether the source representation should be edited to reflect the optimization performed in the target representation. In the Example of FIG. 14, the user is provided with a button 1480 that implements the optimization in the source representation. If button 1480 is activated, the source representation is edited to remove the block 1410 as shown in graphical representation 1400B.

Figure 15:
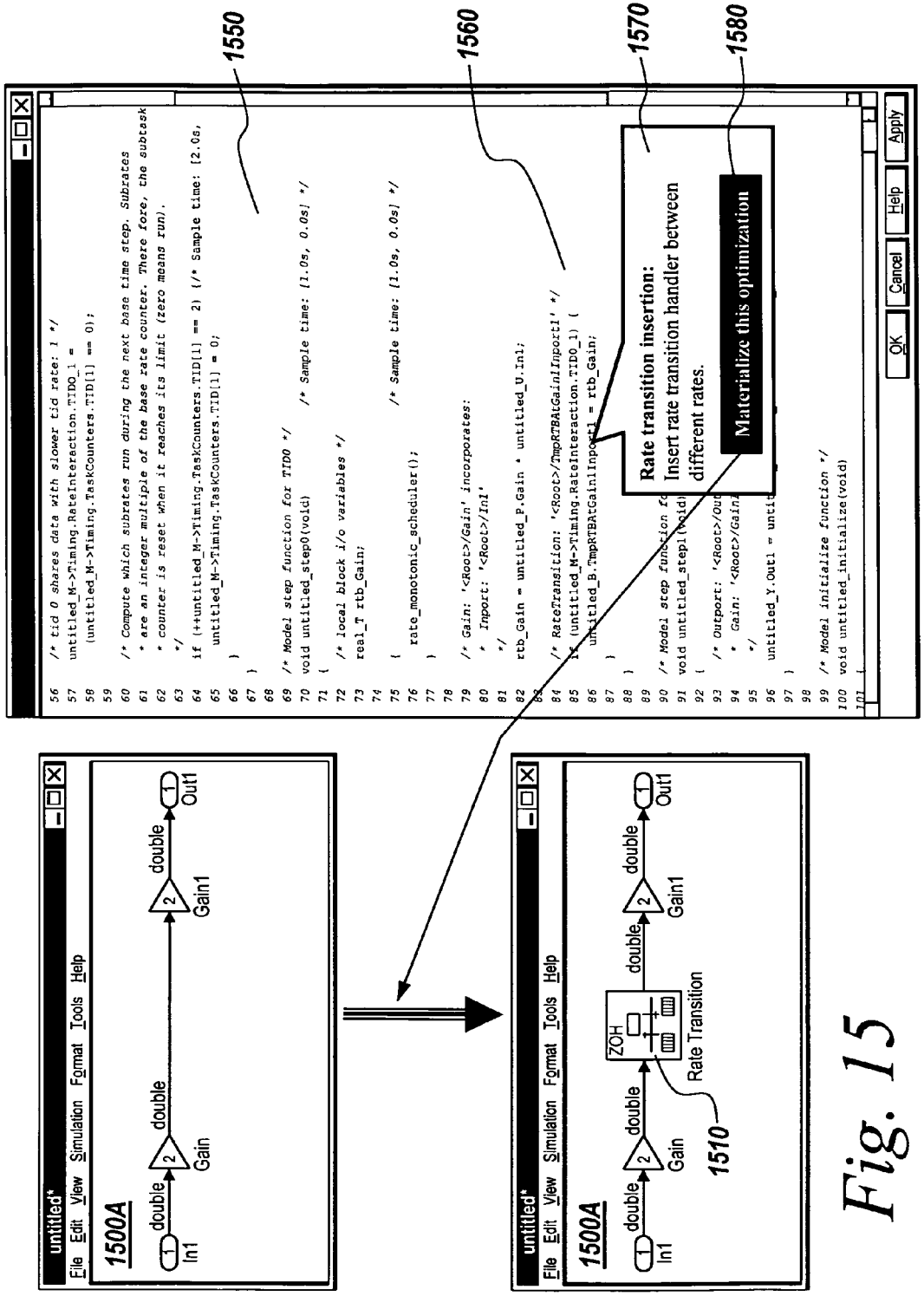
FIG. 15 depicts another embodiment of an exemplary integrated environment wherein an optimization in the target representation is reflected in the source representation.

FIG. 15 depicts another example of an optimization in a target representation of a model that may be reflected in the source representation of the model. In the example of FIG. 15, source representations of the model are displayed with the corresponding target representation. In this example, the source representations of the model are graphical representations 1500A and 1500B. The target representation of the model is code 1550. An indicator 1560 associated with the listing of the optimization 1570 is provided in the code 1550. The optimization relates to block 1510 in graphical representation 1500B. The optimization performed is block insertion as indicated by the listing of the optimization 1570 regarding the notice of optimization. In the present example, a rate transition handler needed to be inserted and was added to the corresponding code 1550.

As discussed previously, in certain embodiments, the user may be provided with the ability to select whether the source representation should be edited to reflect the optimization performed in the target representation. In the Example of FIG. 15, the user is provided with a button 1580 that materializes the optimization in the source representation. If this button is activated, then the source representation is edited to add the rate transition handler 1510 as shown in graphical representation 1500B.

The teachings and concepts described herein may be provided as one or more computer-readable programs embodied on or in one or more mediums. The mediums may be, but are not limited to a hard disk, a compact disc, a digital versatile disc, a flash memory card, a PROM (Programmable Read Only Memory), a RAM (Random Access Memory), a ROM (Read Only Memory), MRAM (magnetoresistive random-access memory), or a magnetic tape. In general, the computer-readable programs may be implemented in any programming language. Some examples of languages that can be used include Python, C, C++, C#, JAVA, etc. Further, the computer readable programs can be implemented in a hardware description language or any other language that allows prescribing computation. The software programs may be stored on or in one or more mediums as object code.

Certain embodiments are described above. It is, however, expressly noted that the teaching disclosed are not limited to these embodiments, but rather the intention is that additions and modifications to what is expressly described herein also are included. Moreover, it is to be understood that the features of the various embodiments described herein are not mutually exclusive and can exist in various combinations and permutations, even if such combinations or permutations are not made express herein.

Since certain changes may be made without departing from the scope of the invention, all matter contained in the above description or shown in the accompanying drawings may be interpreted as illustrative and not in a literal sense. Practitioners of the art will realize that the sequence of steps and architectures depicted in the figures may be altered without departing from the scope provided and that the illustrations contained herein are singular examples of a multitude of possible depictions.

We claim:

1. A non-transitory computer readable medium storing:
one or more computer-executable instructions that, when executed by one or more processors, cause the one or more processors to:
  compile a graphical representation of a model, the compiling:
    generating a target representation of the model from the graphical representation, wherein the target representation of the model is in a programming language, and
    performing a plurality of optimizations with respect to the graphical representation or the target representation during the generating of the target representation, the plurality of optimizations includes at least one of:
      adding a new graphical element to the graphical representation of the model,
      removing an existing graphical element from the graphical representation of the model; or
      modifying an existing graphical element from the graphical representation of the model;
  provide, within the graphical representation of the model or the target representation of the model, a graphically designated indicator;

indicate a particular optimization of the plurality of optimizations using the graphically designated indicator;

associate the graphically designated indicator within the graphical representation of the model or the target representation of the model with one or more sections of code written in the programming language of the target representation of the model;

receive a selection, the selection related to the particular optimization;

apply the particular optimization in the graphical representation and the target representation when the selection indicates that the particular optimization should be enabled; and remove the particular optimization from the graphical representation and the target representation when the selection indicates that the particular optimization should be disabled.

2. The non-transitory computer readable medium of claim 1, wherein the graphical representation includes a block diagram or a relationship diagram.

3. The non-transitory computer readable medium of claim 1, wherein the graphically designated indicator comprises a dynamic indicator.

4. The non-transitory computer readable medium of claim 1, wherein one of the graphical representation or the target representation is displayed when the graphically designated indicator is activated.

5. The non-transitory computer readable medium of claim 1, wherein the graphical representation of the model is obtained from a user.

6. The non-transitory computer readable medium of claim 1, wherein the graphically designated indicator is associated with meta-data included in at least one of the graphical representation or the target representation.

7. The non-transitory computer readable medium of claim 1, further storing instructions that, when executed by the one or more processors, cause the one or more processors to:

display the at least one of the graphical representation or the target representation via an integrated environment.

8. The non-transitory computer readable medium of claim 1, wherein the graphically designated indicator includes information regarding the plurality of optimizations performed.

9. The non-transitory computer readable medium of claim 1, further storing instructions that, when executed by the one or more processors, cause the one or more processors to:

display at least one alternative optimization to perform in place of the particular optimization.

10. The non-transitory computer readable medium of claim 1, further storing instructions that, when executed by the one or more processors, cause the one or more processors to:

receive an input to specify whether the particular optimization should be implemented locally or globally in the target representation of the model.

11. The non-transitory computer readable medium of claim 1, further storing instructions that, when executed by the one or more processors, cause the one or more processors to:

display an explanation of the particular optimization implemented in at least one of the target representation or the graphical representation.

12. The non-transitory computer readable medium of claim 1, wherein the target representation comprises a source code representation generated from compiling the graphical representation, and the medium further storing:

one or more instructions that, when executed by the one or more processors, cause the one or more processors to:
compile the source code representation into object code.

13. The non-transitory computer readable medium of claim 1, wherein the graphically designated indicator highlights a portion of the graphical representation or the target representation related to the one or more of the plurality of optimizations.

14. The non-transitory computer readable medium of claim 1, wherein the plurality of optimizations includes modifying the target representation of the model by at least one of: code elimination, code addition, expression folding, loop unrolling, function inlining, or function outlining.

15. The non-transitory computer readable medium of claim 1, wherein the programming language of the target representation includes one of: C, C++, or Java.

16. The non-transitory computer readable medium of claim 1, further storing instructions that, when executed by the one or more processors, cause the one or more processors to:

receive a selection of an element from the graphical representation; and receive a second selection, based on the selection of an element, from one of the following: block output, input variables, output variables, or block parameters, wherein receiving the block output selection designates segments of code from the target representation that correspond to a block output of the selected element of the graphical representation, receiving the input variables selection designates segments of code from the target representation that correspond to input variables of the selected element of the graphical representation, receiving the output variables selection designates segments of code from the target representation that correspond to output variables of the selected element of the graphical representation, and receiving the block parameters selection designates segments of code from the target representation that correspond to block parameters of the selected element of the graphical representation.

17. The non-transitory computer readable medium of claim 1, further storing instructions that, when executed by the one or more processors, cause the one or more processors to:

receive a highlighting signal lines selection, wherein the highlighting signal lines selection highlights one or more signals in the graphical representation that are affected by the plurality of optimizations.

18. The non-transitory computer readable medium of claim 1, where the target representation of the model is in a high-level programming language.

19. The non-transitory computer readable medium of claim 1, where the target representation of the model comprises a virtual machine.

20. The non-transitory computer readable medium of claim 1, where the target representation of the model comprises an intermediate representation.

21. The non-transitory computer readable medium of claim 1, where the target representation of the model comprises a hardware description.

22. The non-transitory computer readable medium of claim 1, where the target representation of the model comprises embedded code.

23. A method comprising:

compiling, by one or more processors, a graphical representation of a model to generate a target representation of the model, wherein the target representation of the model is in a programming language;

performing, by the one or more processors during the compiling, a plurality of optimizations, the plurality of optimizations including at least one of:
  adding a new graphical element to the graphical representation of the model,
  removing an existing graphical element from the graphical representation of the model, or
  modifying an existing graphical element from the graphical representation of the model;
associating, by the one or more processors, a graphically designated indicator related to a particular optimization of the plurality of optimizations with one or more sections of code written in the programming language;
displaying, by the one or more processors, the one or more sections of code when the graphically designated indicator is activated on at least one of the target representation or the graphical representation;
receiving a selection, the selection related to the particular optimization;
applying the particular optimization in the graphical representation and the target representation when the selection indicates that the particular optimization should be enabled; and
removing the particular optimization from the graphical representation and the target representation when the selection indicates that the particular optimization should be disabled.

24. The method of claim 23, where the target representation of the model is in a high-level programming language.

25. The method of claim 23, where the target representation of the model comprises a virtual machine.

26. The method of claim 23, where the target representation of the model comprises an intermediate representation.

27. The method of claim 23, where the target representation of the model comprises a hardware description.

28. The method of claim 23, where the target representation of the model comprises embedded code.

29. A non-transitory computer readable medium storing:
one or more computer-executable instructions that, when executed by one or more processors, cause the one or more processors to:
  compile a graphical representation of a model to generate a target representation of the model, wherein the target representation is in a programming language;
  perform, during the compiling, a plurality of optimizations, the plurality of optimization including at least one of:
    adding a new graphical element to the graphical representation of the model,
    removing an existing graphical element from the graphical representation of the model, or
    modifying an existing graphical element from the graphical representation of the model;
  associate a graphically designated indicator with one or more sections of code written in the programming language of the target representation of the model, the one or more sections of code related to a particular optimization of the plurality of optimizations;
  receive a selection, the selection related to the particular optimization;
  apply the particular optimization in the graphical representation and the target representation when the selection indicates that the particular optimization should be enabled;
  remove the particular optimization from the graphical representation and the target representation when the selection indicates that the particular optimization should be disabled;
  activate the graphically designated indicator on at least one of the graphical representation or the target representation; and
  dynamically display, along with a display of at least one of the target representation or graphical representation, the one or more sections of code upon activating the graphically designated indicator.

30. The non-transitory computer readable medium of claim 29, wherein the graphically designated indicator and at least one of the target representation or the graphical representation are displayed in an integrated environment.

31. The non-transitory computer readable medium of claim 29, wherein the graphically designated indicator includes information regarding the particular optimization.

32. The non-transitory computer readable medium of claim 29, further storing instructions that, when executed by the one or more processors, cause the one or more processors to:
display an explanation of the particular optimization implemented in at least one of the target representation or the graphical representation.

33. A method comprising:
compiling, by or more processors, a graphical representation of a model to generate a target representation of the model, wherein the target representation of the model is in a programming language;
performing, by the one or more processors during the compiling, a plurality of optimizations, the plurality of optimizations including at least one of:
  adding a new graphical element to the graphical representation of the model,
  removing an existing graphical element from the graphical representation of the model, or
  modifying an existing graphical element from the graphical representation of the model;
associating, by the one or more processors, a graphically designated indicator with one or more sections of code written in the programming language of the target representation, the one or more sections of code related to a particular optimization of the plurality of optimizations;
receiving a selection, the selection related to the particular optimization;
applying the particular optimization in the graphical representation and the target representation when the selection indicates that the particular optimization should be enabled;
removing the particular optimization from the graphical representation and the target representation when the selection indicates that the particular optimization should be disabled;
activating by the one or more processors the graphically designated indicator on at least one of the graphical representation or the target representation; and
dynamically displaying, by the one or more processors along with a display of at least one of the target representation or graphical representation, the one or more sections of code upon activating the graphically designated indicator.

34. A computing system, comprising:
one or more processors executing instructions to:
  generate a target representation of a model that corresponds to a graphical representation of a model, wherein the target representation is in a programming language, perform, during the generating, a plurality of optimizations, the plurality of optimizations including at least one of:
   adding a new graphical element to the graphical representation of the model,
   removing an existing graphical element from the graphical representation of the model, or
   modifying an existing graphical element from the graphical representation of the model,
associate a graphically designated indicator with one or more sections of code written in the programming language of the target representation, the one or more sections of code related to a particular optimization of the plurality of optimizations,
receive a selection, the selection related to the particular optimization;
apply the particular optimization in the graphical representation and the target representation when the selection indicates that the particular optimization should be enabled;
remove the particular optimization from the graphical representation and the target representation when the selection indicates that the particular optimization should be disabled; and
activate the graphically designated indicator on at least one of the graphical representation or the target representation; and
an interface to:
display at least one of the target representation or the graphical representation and the one or more sections of code upon activating the graphically designated indicator.

35. The system of claim 34, wherein the graphical representation of the model is obtained from a user.

36. The system of claim 34, where the target representation of the model is in a high-level programming language.

37. The system of claim 34, where the target representation of the model comprises a virtual machine.

38. The system of claim 34, where the target representation of the model comprises an intermediate representation.

39. The system of claim 34, where the target representation of the model comprises a hardware description.

40. The system of claim 34, where the target representation of the model comprises embedded code.

* * * * *

UNITED STATES PATENT AND TRADEMARK OFFICE
CERTIFICATE OF CORRECTION

PATENT NO.       : 9,342,276 B1
APPLICATION NO.  : 11/999317
DATED            : May 17, 2016
INVENTOR(S)      : Xiaocang Lin et al.

It is certified that error appears in the above-identified patent and that said Letters Patent is hereby corrected as shown below:

In the Claims

In claim 1, column 16, line 62, "model;" should be --model,--.

In claim 29, column 19, line 48, "plurality of optimization" should be --plurality of optimizations--.

In claim 34, column 20, line 67, "language," should be --language;--.

In claim 34, column 21, line 9, "model," should be --model;--.

In claim 34, column 21, line 13, "optimizations," should be --optimizations;--.

Signed and Sealed this
Sixteenth Day of August, 2016

Michelle K. Lee
*Director of the United States Patent and Trademark Office*